Figure 1:
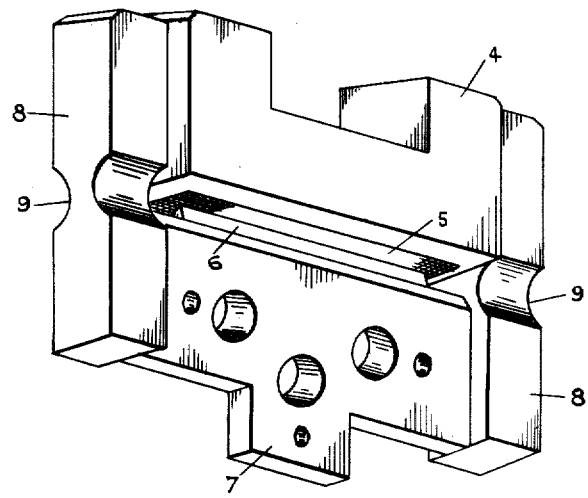

Sept. 23, 1952  H. A. HADLEY  2,611,660
PIVOT AND BEARING ASSEMBLY
Filed Jan. 28, 1949

*INVENTOR.*
HARLAN A. HADLEY.
BY

Patented Sept. 23, 1952

2,611,660

UNITED STATES PATENT OFFICE 2,611,660

PIVOT AND BEARING ASSEMBLY

Harlan A. Hadley, Burlington, Vt., assignor to H. A. Hadley Associates, Inc., Burlington, Vt., a corporation of Vermont Application January 28, 1949, Serial No. 73,270

23 Claims. (Cl. 308—2)

This invention relates to weighing scales, and relates more particularly to a knife edge pivot and bearing assembly adapted for use in weighing scales.

In many weighing mechanisms, levers are supported and the forces are transmitted to and from the levers by means of knife edge pivot and bearing assemblies in which the knife edge pivot rests in a suitably mounted bearing provided with a V-groove. The V-groove normally positions the pivot in a longitudinal plane and anti-friction plates applied to the end of the bearing block normally restrains the pivot from endwise motion. As is well known, such pivot and bearing assemblies are not wholly satisfactory since their use leads to inaccuracies in weighing. Thus, since the V-groove must be made with a bottom having a slight radius to prevent frictional contact of the sides of the V-groove with the sides of the knife edge pivot, the knife edge pivot "skates" over the surface of the flattened bottom of the V-groove causing the lever to assume readily a different position for every different position of the knife edge pivot on the radius portion of the V-groove. The movement of the pivot relative to the radius portion of the V-groove alters the pivot distances, resulting in inaccuracies in the weighing.

It is an important object of this invention to provide an improved knife edge pivot and bearing assembly which will be free from the above-mentioned and other disadvantages and which will be especially simple in construction and efficient in use.

Another object of this invention is to provide a knife edge pivot and bearing assembly wherein the knife edge pivot cooperates with a flat bearing surface and wherein the pivot and the bearing are connected to each other to maintain the same in predetermined operative position relative to each other so that the pivot is free to turn on its normal axis but is restrained from movement in any other direction.

A further object of this invention is to provide a pair of resilient members for holding the pivot and bearing in predetermined operative relation to each other.

Still another object of this invention is the provision of a pair of rubber blocks for maintaining the pivot and bearing in predetermined operative relation to each other.

Other objects of this invention, together with certain details of construction and combinations of parts, will be apparent from the following description and will be pointed out in the appended claims.

Figure 2:
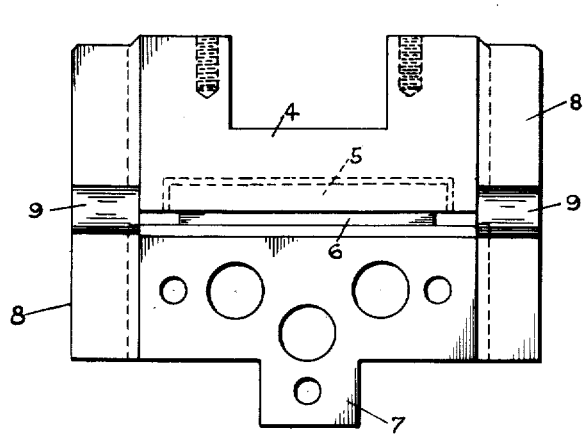
Figure 3:
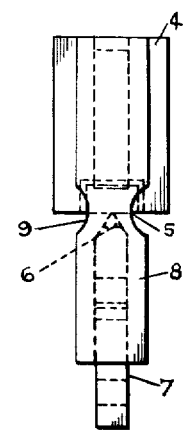

In the drawing, wherein a preferred embodiment of my invention is shown,

Figure 1 is a perspective view of my novel knife edge pivot and bearing assembly, Figure 2 is a front elevational view thereof, and Figure 3 is a side elevational view thereof.

Like reference numerals indicate like parts throughout the several views of the drawing.

Referring now to the drawing for a detailed description of my invention, the reference numeral 4 indicates a bearing block in which is imbedded a bearing 5. The bearing 5 may be made of any suitable material of sufficient hardness. Preferably, the bearing is made of Norbide, a compound of boron and carbon, ground to optical flatness.

Knife edge 6 may be integral with knife edge block 7, or may be suitably held therein; and is preferably made of Carboloy, a tungsten-carbon alloy. However, the knife edge may be made of steel or any other suitable material.

In accordance with the present invention, the knife edge 6 is maintained in proper position on the flat surface of bearing 5 by means of flexured blocks 8. The flexure blocks may be made of any material having the desired, or necessary, resilience. Thus, there may be employed metals, such as steel or other metal, synthetic plastics, such as resins, cellulose esters and ethers and the like and elastomers, namely, natural and synthetic rubbers. I prefer, however, to employ an elastomer which can be bonded to the materials of the bearing and knife edge pivot blocks. If desired, the flexure blocks may be attached to the bearing and pivot blocks in any other suitable manner, as by attaching the same to the bearing and pivot blocks by screws.

In the preferred embodiment of my invention, the bearing and pivot blocks, with the pivot in proper position with respect to the bearing surface, are maintained in fixed position in a suitable jig or clamp while the flexure blocks of the elastomer are substantially permanently bonded to the end surfaces of said blocks. The pivot and bearing assembly thus obtained may be shipped or otherwise handled without throwing the pivot out of proper alignment with the bearing surface. Moreover, my pivot and bearing assembly may be readily attached in the lever system of a weighing scale without the necessity of making any adjustment.

For greater sensitivity, the flexure blocks at the web portion thereof are cut away substantially centrally thereof, as is shown at 9, in such a manner that the smallest cross-section thereof is in line with the knife edge.

The embodiment of my invention shown and described herein is to be considered merely as illustrative, as my invention is susceptible to variation, modification and change within the spirit and scope of the appended claims.

I claim:

1. In a weighing scale having a pivot and bearing assembly, a flexure member, having end portions operatively secured to the pivot and the bearing of said assembly and an intermediate flexible web portion of elastic material connected to said end portions, for restraining the movement of the pivot relative to the bearing.

2. In a weighing scale having a pivot and bearing assembly, a flexure member, having end portions operatively secured to the pivot and the bearing of said assembly and an intermediate flexible web portion of an elastomer connected to said end portions, for restraining the movement of the pivot relative to the bearing.

3. In a weighing scale having a pivot and bearing assembly, a flexure member, having end portions operatively secured to the pivot and the bearing of said assembly and an intermediate flexible web portion of rubber connected to said end portions, for restraining the movement of the pivot relative to the bearing.

4. A pivot and bearing assembly comprising a block having a bearing surface, a block having a knife edge for engagement with said bearing surface, and means for maintaining said knife edge in predetermined relation to said bearing surface, said means comprising a flexure member attached to each pair of corresponding ends of said blocks in vertical alignment with said blocks.

5. A pivot and bearing assembly comprising a block having an optically flat bearing surface, a block having a knife edge for engagement with said bearing surface, and means for maintaining said knife edge in predetermined relation to said bearing surface, said means comprising a flexure member attached to each pair of corresponding ends of said blocks in vertical alignment with said blocks.

6. A pivot and bearing assembly comprising a block having a bearing surface, a block having a knife edge for engagement with said bearing surface, and means for maintaining said knife edge in predetermined relation to said bearing surface, said means comprising a flexure member attached to each pair of corresponding ends of said blocks, in opposed relation to each other and in a plane normal to the plane of the bearing surface.

7. A pivot and bearing assembly comprising a block having an optically flat bearing surface, a block having a knife edge for engagement with said bearing surface, and means for maintaining said knife edge in predetermined relation to said bearing surface, said means comprising a flexure member attached to each pair of corresponding ends of said blocks, in opposed relation to each other and in a plane normal to the plane of the bearing surface.

8. A pivot and bearing assembly comprising a block having a bearing surface, a block having a knife edge for engagement with said bearing surface, and an elastomer flexure member attached to the corresponding ends of said blocks, in opposed relation to each other.

9. A pivot and bearing assembly comprising a block having an optically flat bearing surface, a block having a knife edge for engagement with said bearing surface, and an elastomer flexure member attached to the corresponding ends of said blocks, in opposed relation to each other.

10. A pivot and bearing assembly comprising a block having a bearing surface, a block having a knife edge for engagement with said bearing surface, and a rubber flexure member attached to the corresponding ends of said blocks, in opposed relation to each other and in a plane normal to the plane of the bearing surface.

11. A pivot and bearing assembly comprising a block having an optically flat bearing surface, a block having a knife edge for engagement with said bearing surface, and a rubber flexure member attached to the corresponding ends of said blocks, in opposed relation to each other and in a plane normal to the plane of the bearing surface.

12. A pivot and bearing assembly comprising a block having a bearing surface, a block having a knife edge for engagement with said bearing surface, and an elastomer flexure member attached to the corresponding ends of said blocks, in opposed relation to each other, said flexure members having a reduced cross-sectional area substantially centrally thereof.

13. A pivot and bearing assembly comprising a block having a bearing surface, a block having a knife edge for engagement with said bearing surface, and an elastomer flexure member attached to the corresponding ends of said blocks, in opposed relation to each other, said flexure members being reduced in cross-section substantially centrally thereof, the smallest cross-section of said flexure members being in line with said knife edge.

14. A pivot and bearing assembly comprising a block having a bearing surface, a block having a knife edge for engagement with said bearing surface, and a rubber flexure member attached to the corresponding ends of said blocks, in opposed relation to each other and in a plane normal to the plane of the bearing surface, said flexure members having a reduced cross-sectional area substantially centrally thereof.

15. A pivot and bearing assembly comprising a block having an optically flat bearing surface, a block having a knife edge for engagement with said bearing surface, and a rubber flexure member attached to the corresponding ends of said blocks, in opposed relation to each other and in a plane normal to the plane of the bearing surface, said flexure members being reduced in cross-section substantially centrally thereof, the smallest cross-section of said flexure members being in line with said knife edge.

16. A unitary pivot and bearing assembly comprising a block having a bearing surface, a block having a knife edge in engagement with said bearing surface, and a rubber flexure block substantially permanently bonded to said bearing and knife edge blocks at the corresponding ends of said blocks.

17. A unitary pivot and bearing assembly comprising a block having an optically flat bearing surface, a block having a knife edge in engagement with said bearing surface, and a rubber flexure block substantially permanently bonded to said bearing and knife edge block at the corresponding ends of said blocks.

18. A unitary pivot and bearing assembly comprising a block having a bearing surface, a block having a knife edge in engagement with said bearing surface, and a rubber flexure block substantially permanently bonded to said bearing and knife edge blocks at the corresponding ends of said blocks, said flexure blocks having a reduced cross-sectional area substantially centrally thereof.

19. A unitary pivot and bearing assembly comprising a block having an optically flat bearing surface, a block having a knife edge in engagement with said bearing surface, and a rubber flexure block substantially permanently bonded to said bearing and knife edge blocks at the corresponding ends of said blocks, said flexure blocks having a reduced cross-sectional area substantially centrally thereof.

20. A unitary pivot and bearing assembly comprising a block having a bearing surface, a block having a knife edge in engagement with said bearing surface, and a rubber flexure block substantially permanently bonded to said bearing and knife edge blocks at the corresponding ends of said blocks, said flexure blocks being reduced in cross-section substantially centrally thereof, the smallest cross-section of said flexure blocks being in line with said knife edge.

21. A unitary pivot and bearing assembly comprising a block having an optically flat bearing surface, a block having a knife edge in engagement with said bearing surface, and a rubber flexure block substantially permanently bonded to said bearing and knife edge blocks at the corresponding ends of said blocks, said flexure blocks being reduced in cross-section substantially centrally thereof, the smallest cross-section of said flexure blocks being in line with said knife edge.

22. A unitary pivot and bearing assembly comprising a block having a bearing surface, a block having a knife edge in engagement with said bearing surface, and a rubber flexure block substantially permanently bonded to said bearing and knife edge blocks at the corresponding ends of said blocks, in opposed relation to each other and in a plane normal to the plane of the bearing surface, said flexure blocks being reduced in cross-section substantially centrally thereof, the smallest cross-section of said flexure blocks being in line with said knife edge.

23. A unitary pivot and bearing assembly comprising a block having an optically flat bearing surface, a block having a knife edge in engagement with said bearing surface, and a rubber flexure block substantially permanently bonded to said bearing and knife edge blocks at the corresponding ends of said blocks, in opposed relation to each other and in a plane normal to the plane of the bearing surface, said flexure blocks being reduced in cross-section substantially centrally thereof, the smallest cross-section of said flexure blocks being in line with said knife edge.

HARLAN A. HADLEY.

REFERENCES CITED

The following references are of record in the file of this patent:

UNITED STATES PATENTS

| Number | Name | Date |
|---|---|---|
| 1,071,761 | Leake | Sept. 2, 1913 |
| 2,021,061 | Hedman | Nov. 12, 1935 |

Disclaimer and Dedication 2,611,660.—*Harlan A. Hadley*, Burlington, Vt. PIVOT AND BEARING ASSEMBLIES. Patent dated Sept. 23, 1952. Disclaimer and dedication filed Jan. 2, 1963, by the assignee, *Toledo Scale Corporation*.

Hereby enters this disclaimer and dedication to the public of all claims in said patent.

[*Official Gazette February 19, 1963.*]